United States Patent [19]

Chen et al.

[11] Patent Number: 5,106,897

[45] Date of Patent: * Apr. 21, 1992

[54] METHOD FOR IMPROVING THE LOW TEMPERATURE IMPACT STRENGTH OF POLYBLENDS OF THERMOPLASTIC COPOLYESTERS AND STYRENE ACRYLONITRILE COPOLYMERS

[75] Inventors: James Y. Chen, Somers, Conn.; Donald B. Baldridge, Wilbraham, Mass.

[73] Assignee: Monsanto Company, Springfield, Mass.

[*] Notice: The portion of the term of this patent subsequent to Jan. 22, 2008 has been disclaimed.

[21] Appl. No.: 481,638

[22] Filed: Feb. 20, 1990

[51] Int. Cl.$^5$ ............................................. C08L 67/02
[52] U.S. Cl. ................................... 524/228; 524/210; 524/300; 524/321; 524/322; 524/385; 524/394; 524/400; 525/173; 525/175
[58] Field of Search ................ 525/175, 173; 524/322, 524/210, 228, 300, 321, 385, 394, 400

[56] References Cited

U.S. PATENT DOCUMENTS

| | | | |
|---|---|---|---|
| 3,355,404 | 11/1967 | Ruffing | 524/322 |
| 3,516,957 | 6/1970 | Gray | 524/394 |
| 4,148,956 | 4/1979 | Breitenfellner | 428/156 |
| 4,409,351 | 10/1983 | Lee | 524/322 |
| 4,500,665 | 2/1985 | Brecker | 524/227 |
| 4,987,187 | 1/1991 | Udipi | 525/173 |

FOREIGN PATENT DOCUMENTS

| | | |
|---|---|---|
| 165615 | 12/1985 | European Pat. Off. |
| 269022 | 6/1988 | European Pat. Off. |
| 56-016541 | 2/1981 | Japan |

Primary Examiner—Patricia Short

[57] ABSTRACT

A method for improving the low temperature impact strength of a thermoplastic polyblend of PETG and SAN which method comprises incorporating therein an effective amount of a dispersant selected from the group consisting of mono- and di-carboxylic acids containing 6 to 36 carbon atoms; alkali and alkaline-earth metal salts and amides of such acids; and aliphatic alcohols containing 6 to 36 carbon atoms.

12 Claims, No Drawings

METHOD FOR IMPROVING THE LOW TEMPERATURE IMPACT STRENGTH OF POLYBLENDS OF THERMOPLASTIC COPOLYESTERS AND STYRENE ACRYLONITRILE COPOLYMERS

BACKGROUND OF THE INVENTION

This invention relates to a method for improving the low temperature impact strength of polyblends comprised of thermoplastic copolyesters and styrenic copolymers. More specifically, it relates to a method wherein an additive is added to a polyblend of a copolyester and a styrene acrylonitrile copolymer resulting in a product with improved low temperature impact strength.

The present invention is related to pending U.S. Pat. No. 4,987,187, filed Dec. 20, 1989 and assigned to the same Assignee, Monsanto Company. That application discloses a blend of copolyester (PETG) and styrene acrylonitrile copolymer (SAN) that produces a product exhibiting good toughness, as demonstrated by impact strength, and good clarity.

Yet for certain applications such as refrigerator crisper pans improved low temperature impact strength is required without an adverse effect on the polyblends clarity.

It has now been discovered, in accordance with the present invention, that the low temperature impact strength of articles molded from the polyblends disclosed in U.S. Pat. No. 4,987,187 is improved by the addition of an effective amount of an additive. These additives are believed to act as dispersants for the SAN. The dispersants are believed to function by breaking up larger domains of SAN and dispersing the SAN phase more uniformly throughout the PETG phase. However, the dispersion activity is only a theory and there is no intent on the part of the inventors to be bound by it. Whether the theory is correct or not, a significant improvement in low temperature impact strength is obtained by the practice of this invention. An improvement is also noted in the mold release characteristics of these polyblends upon addition of an effective amount of dispersant. The clarity of the inventive polyblend is unaffected.

Accordingly, it is a primary object of the present invention to provide a method for improving the low temperature impact strength of polyblends comprised of thermoplastic copolyesters and styrene copolymers which comprises incorporating therein an effective amount of a dispersant.

DESCRIPTION OF THE PRIOR ART

The thermoplastic polyblend of PETG and SAN, the polyblend used in the present invention, is described in U.S. Pat. No. 4,987,187 which is incorporated herein by reference. The blends comprise (A) PETG which is a copolyester of a dicarboxylic acid moiety, at least 50 mole percent of which is terephthalic acid or dimethyl terephthalate, and a dihydric alcohol moiety, at least 50 mole percent of which is ethylene glycol and 20 to 50 mole percent of which is diethylene glycol or 1,4-cyclohexanedimethanol, the copolyester having a glass transition temperature (Tg) in the range of 40° to 85° C. and an inherent viscosity (I.V.) in the range of 0.2 to 10, with the viscosity being determined at 25° C. using 0.5 grams of polymer per 100 ml. of a solvent composed of 60% phenol and 40% tetrachloroethane, and (B) SAN which is a copolymer of a styrenic monomer that can be styrene itself or various derivatives of styrene in which either or both of the benzene ring and the vinyl group can be substituted, as by, for example, an alkyl group or a halogen atom, and an ethylenically unsaturated nitrile monomer including acrylonitrile, methacrylonitrile and ethacrylonitrile. The copolymer will usually be comprised of 65 to 90% by weight of the styrenic monomer and 35 to 10% by weight of the nitrile monomer. The polyblend will usually be comprised of 95 to 65% by weight of the copolyester and 5 to 35% by weight of the copolymer.

SUMMARY OF THE INVENTION

The subject invention resides in the discovery that the addition of an effective amount of a dispersant to the thermoplastic polyblend comprised of PETG and SAN results in improvement of the low temperature impact properties of articles molded from these compounds with no adverse effect on the polyblends clarity. These polyblends are useful in a wide variety of applications including low temperature applications such as crisper pans for refrigerators, various medical applications, covers for electronic equipment and any other application which requires low temperature toughness and clarity.

DESCRIPTION OF THE PREFERRED EMBODIMENTS

In the present invention, an effective amount of a dispersant is incorporated into the PETG/SAN polyblend. The dispersant is selected from the group consisting of mono- and dicarboxylic acids containing 6 to 36 carbon atoms; alkali and alkaline-earth metal salts and amides of such acids; and aliphatic alcohols containing 6 to 36 carbon atoms.

The PETG/SAN polyblend employed in the present invention is comprised of: (1) 95 to 65% by weight of PETG which is a copolyester of a dicarboxylic acid moiety, at least 50 mole percent of which is terephthalic acid, and a dihydric alcohol moiety, at least 50 mole percent of which is ethylene glycol and 20 to 50 mole percent of which is diethylene glycol or 1,4-cyclohexanedimethanol, and (2) 5 to 35% by weight of SAN copolymer prepared from a styrenic monomer and an ethylenically unsaturated nitrile. The total amount of (1) and (2) is 100% by weight.

The preferred PETG is purchased from Eastman Chemical Products, Inc. under the product name Kodar PETG Copolyester 6763 or Ektar GN 001.

The preferred SAN contains 65 to 90% by weight of styrene and 35 to 10% by weight of acrylonitrile and has a number average molecular weight of at least 5000. Other known derivatives of styrene, such as alpha-methylstyrene, may be used to replace the styrene monomer and other ethylenically unsaturated nitriles, such as methacrylonitrile and ethacrylonitrile, may be used to replace the acrylonitrile monomer provided that the requirements of processability, toughness and clarity are met in the final blend. Mixtures of styrenic monomers and mixtures of ethylenically unsaturated nitriles can also be employed if desired provided again that the desired toughness, clarity and processability is obtained in the final blend. The preferred SAN is available from Monsanto Company under the product name Lustran ® SAN 31.

The preferred molding composition contains 95 to 65% by weight of the copolyester, PETG, 5 to 35% by weight of the SAN copolymer, based on the total weight of PETG and SAN, and an effective amount of a dispersant, as to provide a composition with a low temperature (0° C.) impact strength of greater than 3.5 Joules (J) and more preferably greater than 5.5 J.

The preferred monocarboxylic acids include hexanoic, octanoic, decanoic, lauric (dodecanoic), stearic, behenic (docosanoic), and the like and mixtures thereof. They also include branched-chain acids such as 2-ethyl hexanoic, isodecanoic, and the like. Substituted acids such as the hydroxyl, aryl, halogenated or amino derivatives of such acids are also included. Hydroxyl substituted acids may include those such as hydroxycaproic (leucinic) acid, hydroxycapric acid and the like. Mixtures of all the above acids are also contemplated.

The preferred dicarboxylic acids include adipic, pimelic, suberic, and azelaic acids and mixtures thereof. They may also include branched-chain acids such as 2-ethyl hexanedioic, isodecandioic, and the like. Substituted acids such as the hydroxy, aryl, halogenated or amino derivatives of such acids are also included. Mixtures of all the above acids are also contemplated.

The preferred metal portion of the salts of the mono- or dicarboxylic acids include sodium, potassium and magnesium.

The preferred amides of the mono- or dicarboxylic acids include stearamide, phthalimide and the like. Mixtures of the above amides are also contemplated.

The preferred aliphatic alcohols include n-hexanol, n-heptanol, n-octanol, n-decanol, n-dodecanol, 3-hexen-1-ol, 4-hexen-1-yn-3-ol and the like. Mixtures of the above aliphatic alcohols are also contemplated.

The especially preferred dispersants are lauric acid, stearic acid, behenic acid, sodium stearate and bis-stearamide.

In general, the amount of dispersant used is at least about 0.05% by weight, based on the weight of the polyblend. The low temperature impact test results, as shown in the WORKING EXAMPLE section, demonstrate that for a given dispersant there is an effective amount and increasing the amount used beyond this effective amount results in a loss of impact. Those skilled in the art, upon reading the present specification, will readily be able to determine the optimum amount of dispersant to be used in any given polyblend.

The incorporation of the dispersant into the PETG/SAN polyblend may be done by any of the known prior art methods. These include compounding an effective amount into a mixture of PETG and SAN pellets, or as an external coating or dusting on the compounded pellets, or as an external coating or dusting on a mixture of these pellets to be molded directly without compounding.

In the following examples, which are not to be construed as limiting, the inventive polyblend was molded into "crisper pans" and chips. The crisper pans are of the size and type used as drawers in refrigerators to hold fruits, vegetables and meats.

WORKING EXAMPLES

In the working examples set forth below the following components are used:

PETG—a copolyester of a dicarboxylic acid moiety, at least 50 mole percent of which is terephthalic acid, and a dihydric alcohol moiety, at least 50 mole percent of which is ethylene glycol and 20 to 50 mole percent of which is 1,4-cyclohexanedimethanol and purchased from Eastman Chemical Products, Inc. under the product name Kodar PETG Copolyester 6763 or Ektar GN 001.

SAN—a copolymer of 78% by weight based on the weight of the copolymer of styrene and 22% by weight based on the weight of the copolymer of acrylonitrile sold by Monsanto Company under the name Lustran® SAN 31.

LAURIC ACID—$CH_3(CH_2)_{10}COOH$—in powder form available from Matheson, Coleman and Bell under the product designation LX60.

STEARIC ACID—$CH_3(CH_2)_{16}COOH$—in flake form available from Fisher Scientific Co.—Lot No. 790614.

BEHENIC ACID—docosanoic acid—$CH_3(CH_2)_{20}COOH$ in flake form available from Witco Chemical Co.—Lot No. 7T4437.

SODIUM STEARATE—$NaC_{18}H_{35}O_2$—available from Witco Chemical Co.

BIS-STEARAMIDE(ACRAWAX)—in prilled form available from Lonza Co.

SAMPLE PREPARATION

1. Preparation Method 1

In this method PETG and SAN pellets were mixed and then dusted with a specific dispersant. The dusted, mixed pellets were then molded into "crisper pans" in a Battenfeld Molding Machine (Model 750 ton) using the following molding conditions:

| Barrel Temperature: | 250° C. |
| --- | --- |
| Mold Temperature: | 30° C. |
| Injection Pressure: | 1.38 MPa |
| Injection Fill Time: | 3.0 seconds |

Test specimens, having the dimensions 7.6 cm × 10.2 cm × 0.3 cm, were then cut from the molded "crisper pans" and were conditioned at 23° ± 2° C. at 50 ± 5% relative humidity for 40 hours and then for 2 hours at 0° ± 2° C. and 50 ± 5% relative humidity before testing for low temperature impact strength.

2. Preparation Method 2

In this method the dusted, mixed pellets, described above, were further processed by compounding in a 1" Killion Extruder under the following conditions:

| Temperature: | 232° C. |
| --- | --- |
| Screw Speed: | 100 rpm |

The extruded materials were pelletized and then molded into 7.6 cm × 10.2 cm × 0.3 cm chips in an Engel Molding Machine (Model No. ES80) using the following molding conditions:

| Barrel Temperature: | 225° C. |
| --- | --- |
| Mold Temperature: | 35° C. |
| Injection Pressure: | 8.27 MPa |
| Injection Fill Time: | 2.5 seconds |

The molded chips were conditioned at 23° ± 2° C. at 50 ± 5% relative humidity for 40 hours and then for 2 hours at 0°±2° C. and 50±5% relative humidity before testing for low temperature impact strength.

TEST METHOD

The molded specimens were tested for low temperature impact using ASTM D-3763-85. This test determines puncture properties of plastics and is designed to provide the impact load versus deformation response of plastics under essentially multiaxial deformation conditions at a stated impact velocity. The energy at maximum is the energy, in joules, at the point where maximum load first occurs. This value represents the energy necessary to deform or penetrate the material and is also known as the impact strength of the test specimen.

A Fractovis Instrumented Impact Tester sold by Ceast S.p.A., Italy (Model No. 6789/000) was utilized with the moveable striker assembly positioned at a starting distance of 57.6 cm from the fixed sample. The striker was operated at a testing speed (velocity immediately before striking sample) of 200 m/min (8000 in/min). The results are given in Joules.

In the working examples the amount of dispersant used is given in percent (%) by weight based on the total amount of the polymer composition.

EXAMPLES 1 TO 5

In these examples test specimens prepared by Preparation Method 1 containing 0.1% Stearic acid and various amounts of PETG and SAN were tested for low temperature impact strength as demonstrated by the ENERGY at MAXIMUM measurements. The results are tabulated in Table I.

TABLE I

Summary of Examples 1 to 5

| EXAMPLE | % PETG | % SAN | % STEARIC ACID | MULTIAXIAL INSTRUMENTED IMPACT ENERGY at MAXIMUM (Joules) |
| --- | --- | --- | --- | --- |
| (1) Control | 70 | 30 | 0 | 0.95 |
| (2) | 70 | 30 | 0.1 | 17.4 |
| (3) | 75 | 25 | 0.1 | 23.7 |
| (4) | 80 | 20 | 0.1 | 25.8 |
| (5) | 85 | 15 | 0.1 | 25.5 |

A comparison of Examples 1 and 2 demonstrates that the addition of 0.1% stearic acid to the PETG/SAN polyblend results in a polyblend with increased low temperature impact strength. In addition, Table I shows the low temperature impact strength of the molded samples generally increasing with increasing amounts of PETG in the range of 70 to 85% PETG while holding the amount of dispersant (stearic acid) at 0.1%.

EXAMPLES 6 TO 24

In these examples, test specimens prepared by Preparation Method 2 and containing 70% PETG, 30% SAN and various amounts of a specified dispersant were tested for low temperature impact strength as demonstrated by the ENERGY at MAXIMUM measurements. The results are tabulated in Table II.

TABLE II

Samples of Examples 6 to 24

| EXAMPLE | DISPERSANT | % DISPERSANT | MULTIAXIAL INSTRUMENTED IMPACT ENERGY at MAXIMUM (Joules) |
| --- | --- | --- | --- |
| (6) Control | None | 0.00 | 0.95 |
| (7) | lauric acid | 0.05 | 9.36 |
| (8) | lauric acid | 0.10 | 4.47 |
| (9) | lauric acid | 0.20 | 6.64 |
| (10) | lauric acid | 0.50 | 1.08 |
| (11) | stearic acid | 0.05 | 9.76 |
| (12) | stearic acid | 0.10 | 7.46 |
| (13) | stearic acid | 0.20 | 9.76 |
| (14) | stearic acid | 0.50 | 1.08 |
| (15) | behenic acid | 0.05 | 5.56 |
| (16) | behenic acid | 0.10 | 6.78 |
| (17) | behenic acid | 0.20 | 5.29 |
| (18) | behenic acid | 0.50 | 7.73 |
| (19) | sodium stearate | 0.05 | 7.73 |
| (20) | sodium stearate | 0.10 | 7.73 |
| (21) | sodium stearate | 0.50 | 1.63 |
| (22) | bis-stearamide | 0.05 | 18.17 |
| (23) | bis-stearamide | 0.10 | 3.80 |
| (24) | bis-stearamide | 0.50 | 0.95 |

Examples 7 to 10 demonstrate the effect of various percentages of lauric acid on the low temperature impact strength of the 70/30 PETG/SAN molded polyblend. Addition of 0.05, 0.10 and 0.20% lauric acid results in an increase in the low temperature impact strength of the molded samples. Yet the impact strength drops as the % lauric acid increases from 0.20 to 0.50%.

Examples 11 to 14 demonstrate the effect of various percentages of stearic acid on the low temperature impact strength of the 70/30 PETG/SAN molded polyblend. Similar to the lauric acid examples above, addition of 0.05, 0.10 and 0.20% stearic acid results in an increase in the low temperature impact strength of the molded samples and a drop in the impact strength value is noted as the % stearic acid increases from 0.20 to 0.50%.

Examples 15 to 18 demonstrate the effect of various percentages of behenic acid on the low temperature impact strength of the 70/30 PETG/SAN molded polyblend. The entire range of dispersant percentages tested resulted in an increase in the impact strength of the molded polyblend.

Examples 19 to 21 demonstrate an increase in the low temperature impact strength of the molded samples when 0.05 to 0.10% sodium stearate is added. The low temperature impact strength drops when the amount of sodium stearate is increased to 0.50%.

The addition of 0.05% bis-stearamide to the molded polyblend (Example 22) results in the highest impact value obtained in this set of test specimens. This value dropped dramatically as the amount of bis-stearamide was increased to 0.5% by weight.

The impact results show that for a given dispersant there is an effective amount and increasing the amount used beyond this effective amount results in a loss of impact. For example, 0.05% by weight of bis-stearamide provides an impact value of about 18 (See Example 22). However, when 0.5% by weight was used the impact value was the same as the control (0.95 Joules). Those skilled in the art, upon reading the present specification, will readily be able to determine the optimum amount of dispersant to be used in any given polyblend.

In addition to the dispersants, the polyblends of the invention may contain other additives such as plasticizers, lubricants, antioxidants, stabilizers, flame-retardants, fibers, mineral fibers, dyes, pigments and the like, provided that such additives do not have an adverse effect on clarity and toughness.

Having thus described the invention what is claimed is:

1. A method for improving the low temperature impact strength of a thermoplastic polyblend comprising:
   a) from 95 to 65% by weight of PETG which is a copolyester of a dicarboxylic acid moiety, at least 50 mole percent of which is terephthalic acid and a dihydric alcohol moiety, at least 50 mole percent of which is ethylene glycol, and from 20 to 50 mole percent of which is diethylene glycol or 1,4-cyclohexanedimethanol, the copolyester having a glass transition temperature (Tg) in the range of 40° to 85° C. and an inherent viscosity (I.V.) in the range of 0.2 to 10; and
   b) from 5 to 35% by weight of an SAN copolymer comprising 65 to 90% by weight based on the weight of the copolymer of a styrenic monomer and 35 to 10% by weight based on the weight of the copolymer of an ethylenically unsaturated nitrile;
   wherein the amount of components (a) and (b) total 100% by weight
which method comprises incorporating therein at least 0.05% by weight, based on the weight of the thermoplastic polyblend, of a dispersant selected from the group consisting of mono- and di-carboxylic acids containing 6 to 36 carbon atoms; alkali and alkaline-earth metal salts and amides of such acids; and aliphatic alcohols containing 6 to 36 carbon atoms.

2. The method of claim 1 wherein the dispersant is lauric acid.

3. The method of claim 1 wherein the dispersant is stearic acid.

4. The method of claim 1 wherein the dispersant is behenic acid.

5. The method of claim 1 wherein the dispersant is sodium stearate.

6. The method of claim 1 wherein the dispersant is bis-stearamide.

7. A composition having improved low temperature impact strength comprising a thermoplastic polyblend comprising:
   a) from 95 to 65% by weight of PETG which is a copolyester of a dicarboxylic acid moiety, at least 50 mole percent of which is terephthalic acid and a dihydric alcohol moiety, at least 50 mole percent of which is ethylene glycol, and from 20 to 50 mole percent of which is diethylene glycol or 1,4-cyclohexanedimethanol, the copolyester having a glass transition temperature (Tg) in the range of 40° to 85° C. and an inherent viscosity (I.V.) in the range of 0.2 to 10; and
   b) from 5 from 35% by weight of an SAN copolymer comprising 65 to 90% by weight based on the weight of the copolymer of a styrenic monomer and 35 to 10% by weight based on the weight of the copolymer of an ethylenically unsaturated nitrile;
   wherein the amount of components (a) and (b) total 100% by weight
having incorporated therein, at least 0.05% by weight, based on the weight of the thermoplastic polyblend, of a dispersant selected from the group consisting of mono- and di-carboxylic acids containing 6 to 36 carbon atoms; alkali and alkaline-earth metal salts and amides of such acids; and aliphatic alcohols containing 6 to 36 carbon atoms.

8. The composition of claim 7 wherein the dispersant is lauric acid.

9. The composition of claim 7 wherein the dispersant is stearic acid.

10. The composition of claim 7 wherein the dispersant is behenic acid.

11. The composition of claim 7 wherein the dispersant is sodium stearate.

12. The composition of claim 7 wherein the dispersant is bis-stearamide.

* * * * *